(12) United States Patent
Chen et al.

(10) Patent No.: US 7,994,976 B2
(45) Date of Patent: Aug. 9, 2011

(54) SATELLITE SIGNAL ADAPTIVE TIME-DIVISION MULTIPLEXING RECEIVER AND METHOD

(75) Inventors: Chun-nan Chen, Taipei (TW); Jui-Ming Wei, Taipei (TW)

(73) Assignee: MEDIATEK Inc., Hsin-Chu (TW)

( * ) Notice: Subject to any disclaimer, the term of this patent is extended or adjusted under 35 U.S.C. 154(b) by 900 days.

(21) Appl. No.: 11/948,726

(22) Filed: Nov. 30, 2007

(65) Prior Publication Data

US 2008/0084954 A1    Apr. 10, 2008

Related U.S. Application Data

(63) Continuation-in-part of application No. 11/406,644, filed on Apr. 19, 2006, now Pat. No. 7,474,260, and a continuation-in-part of application No. 11/775,114, filed on Jul. 9, 2007, now Pat. No. 7,916,075.

(51) Int. Cl.
*G01S 19/24* (2010.01)
*G01S 19/29* (2010.01)
*G01S 19/30* (2010.01)

(52) U.S. Cl. ......... 342/357.63; 342/357.68; 342/357.69

(58) Field of Classification Search ............. 342/357.63, 342/357.68, 357.69
See application file for complete search history.

(56) References Cited

U.S. PATENT DOCUMENTS

| | | | |
|---|---|---|---|
| 6,504,816 B1 | 1/2003 | Lee et al. | |
| 6,657,986 B1 | 12/2003 | Laudel et al. | |
| 6,748,015 B2 | 6/2004 | Kohli et al. | |
| 6,778,135 B2 * | 8/2004 | Warloe et al. | 342/357.63 |
| 6,836,241 B2 * | 12/2004 | Stone et al. | 342/357.63 |
| 7,130,326 B2 * | 10/2006 | Bow et al. | 375/130 |
| 7,817,084 B2 * | 10/2010 | Pon et al. | 342/357.69 |
| 2003/0174792 A1 | 9/2003 | Bow et al. | |
| 2007/0085736 A1 | 4/2007 | Ray et al. | |

FOREIGN PATENT DOCUMENTS

| | | |
|---|---|---|
| EP | 1387500 | 2/2004 |
| GB | 2397989 A * | 4/2004 |
| WO | 02/25829 | 3/2002 |
| WO | 02/46787 | 6/2002 |
| WO | 03017503 A2 | 2/2003 |
| WO | WO 2006067538 A1 * | 6/2006 |

OTHER PUBLICATIONS

Sousa et al (An Acquisition Algorithm for Weak Signals in Galileo and Modernized GPS), Proc ESA Workshop on Satellite Navigation User Equioment Technologies, Netherlands vol. 1, pp. 480-487, Dec. 2004.*

Corazza et al (Galileo Primary Code Acquisition Based on Multi-hypothesis Secondary Code Ambiguity Elimination), ION GNSS 2007, Sep. 25-28, 2007.*

Villanti et al (Robust Code Acquisition in the Presence of BOC Modulation for Future Galileo Receivers), IEEE International Conf. (ICC) Jun. 24-28, 2007, Glaskow, Scotland, UK.*

* cited by examiner

*Primary Examiner* — Gregory C Issing

(57) ABSTRACT

An adaptive time-division multiplexing receiver and method for a GNSS system using pilot and data channels for each satellite are disclosed. According to the present invention, multiplexing hypotheses of correlation are properly distributed to pilot and data channels. The pilot and data channels of one satellite can be dealt with as two satellites. Alternatively, correlation is mainly executed to the pilot channel. After the pilot channel is acquired, information such as code phase and Doppler frequency of the satellite are known. Therefore, the data can be demodulated based on the known information.

20 Claims, 5 Drawing Sheets

US 7,994,976 B2

SATELLITE SIGNAL ADAPTIVE TIME-DIVISION MULTIPLEXING RECEIVER AND METHOD

CROSS-REFERENCE TO RELATED APPLICATIONS

The present application is a continuation-in-part of U.S. patent application Ser. No. 11/406,644, entitled "Adjustable time-division multiplexing receiver for receiving satellite signal and method for the same", filed on Apr. 19, 2006, and has be granted as U.S. Pat. No. 7,474,260, and U.S. patent application Ser. No. 11/775,114, entitled "Satellite signal adaptive time-division multiplexing receiving device", filed on Jul. 9, 2007, now U.S. Pat. No. 7,916,075.

TECHNICAL FIELD OF THE INVENTION

The present invention relates to satellite signal receiver, more particularly, to an adaptive time-division multiplexing (TDM) receiver and method for a GNSS system utilizing a pilot channel and a data channel for each satellite.

BACKGROUND OF THE INVENTION

For a receiver detecting data loaded in spread spectrum signal transmitted in a GNSS (Global Navigation Satellite System) such as GPS, GLONASS, GALILEO system and the like, there are three domains should be considered: visible satellite ID, Doppler frequency, and code phase. In a cold start state, such as in the beginning when the receiver starts to work, the visible satellite ID, the recent Doppler frequency and the code phase are all unknown. Accordingly, it is necessary to try each possible combination of these three domains. One combination of a specific satellite ID, a specific Doppler frequency, and a specific code phase is referred to a "hypothesis". For a satellite SVx, if there are M possible Doppler frequencies DF0, DF1, . . . DFm−1, and N code phases CP0, CP1, . . . CPn−1 to be tried, then there are M×N hypotheses, as shown in FIG. 1. As can be deduced, when there are X satellites SV0, SV1, . . . , SVx−1, the total number of hypotheses will be X×M×N, as shown in FIG. 2. In the worst case, X×M×N correlation trials should be done to acquire a specific GPS signal. In some applications, a half or a quarter chip code spacing is necessary to achieve higher tracking accuracy. Therefore, an extra factor P is introduced. When the chip code spacing is half chip, P=2; when the chip code spacing is one fourth chip, P=4. The rest can be deduced accordingly. Then the total hypothesis number is X×M×N×P.

The most intuitive method is to try all the hypotheses one by one if only one correlator is available in the receiver. If two correlators are available, then two hypotheses can be tried at the same time. Accordingly, the speed can be double. As can be understood, if the speed is to be considerably lifted, a great number of correlators are needed. This causes increases in cost and hardware complexity.

For a GNSS signal, the chipping rate of pseudo-random code is 1.023 MHz, and the period thereof is 1023 chips, which is 1 millisecond. Therefore, a correlator having 1023 pairs of multipliers and adders (each pair has a single multiplier and a single adder) is needed to correlate the received signal if the clock rate of the correlator is only 1 kHz. The searching rate is one hypothesis per millisecond. However, such a correlator, which has 1023 pairs of multipliers and adders, is too complex. In addition, the clock rate of 1 kHz is too slow in practice. The scale of the correlator can be reduced by increasing the clock rate to achieve the same effect. For example, if 33 kHz clock rate is used, then only 31 pairs of multipliers and adders are required.

As described above, the hardware complexity can be reduced by increasing the clock rate, but the hypothesis searching rate is still one hypothesis per millisecond. There are 1023 hypotheses in code phase domain for a specific satellite and a specific Doppler frequency. If the clock rate is further raised to 33 kHz×1023=33.759 MHz, then all code phase hypotheses for the satellite and the specific Doppler frequency can be tried in one millisecond. In some applications, higher accuracy is required, so that half chip spacing, for example, is necessary. Then there are 2046 hypotheses are to be tried in the code phase domain for a specific satellite and a specific Doppler frequency. Accordingly, the clock rate can be further raised to 33.759 MHz×2=67.518 MHz, and 2046 hypotheses are tried in one millisecond. As the clock rate increasing, additional memory capacity is required. However, this is not a big problem because a memory is low-cost in comparison with a multiplier and adder. In addition to increasing clock rate, it is necessary to properly arrange multiplexing of the searching capability for the respective domains so as to be adapted to various application conditions.

In some GNSS systems such as European GNSS system GALILEO, two signal channels, defined as a pilot channel and a data channel, are transmitted from each satellite. The pilot channel is dataless. That is, no data message for navigation is carried in the pilot channel. The navigation data is carried in the data channel. A signal transmitted via the pilot channel is called "a pilot signal", which is known for a receiver. By using the pilot signal as assistance information, long coherent integration time of the order of seconds can be attained to achieve higher tracking accuracy.

SUMMARY OF THE INVENTION

The present invention is to provide a satellite signal adaptive time-division multiplexing receiver and method for a GNSS system in which each satellite transmits a pilot channel and a data channel. By using the present invention, workload of the receiver can be more efficiently allotted; in addition, power consumption can be reduced.

In accordance with a first aspect of the present invention, a receiver receives a pilot channel and a data channel from a satellite. The data channel has a PRN code different from the pilot channel while common Doppler frequency and code phase. The receiver comprises a correlator for executing correlation; a clock controller controlling a clock rate for the correlator; and a receiver controller providing a total hypothesis number can be tried in a specific period to the clock controller so that the clock controller controls the clock rate for the correlator according to the total hypothesis number and setting a hypothesis distribution to instruct how the correlator executes correlation to the total hypotheses for the pilot and data channels of the satellite within the specific period (e.g. 1 ms) in TDM scheme. The total hypotheses are distributed under the consideration of available satellites (i.e. PRN codes), code phases, Doppler frequencies and accuracy.

In accordance with the second aspect of the present invention, a method for receiving the pilot channel and data channel from a satellite comprises: setting a hypothesis distribution to instruct how correlation is executed to the total hypotheses for the pilot and data channels of the satellite within the specific period (e.g. 1 ms); and executing correlation to each hypothesis according to the hypothesis distribution in TDM scheme.

DETAILED DESCRIPTION OF THE INVENTION

Figure 1:
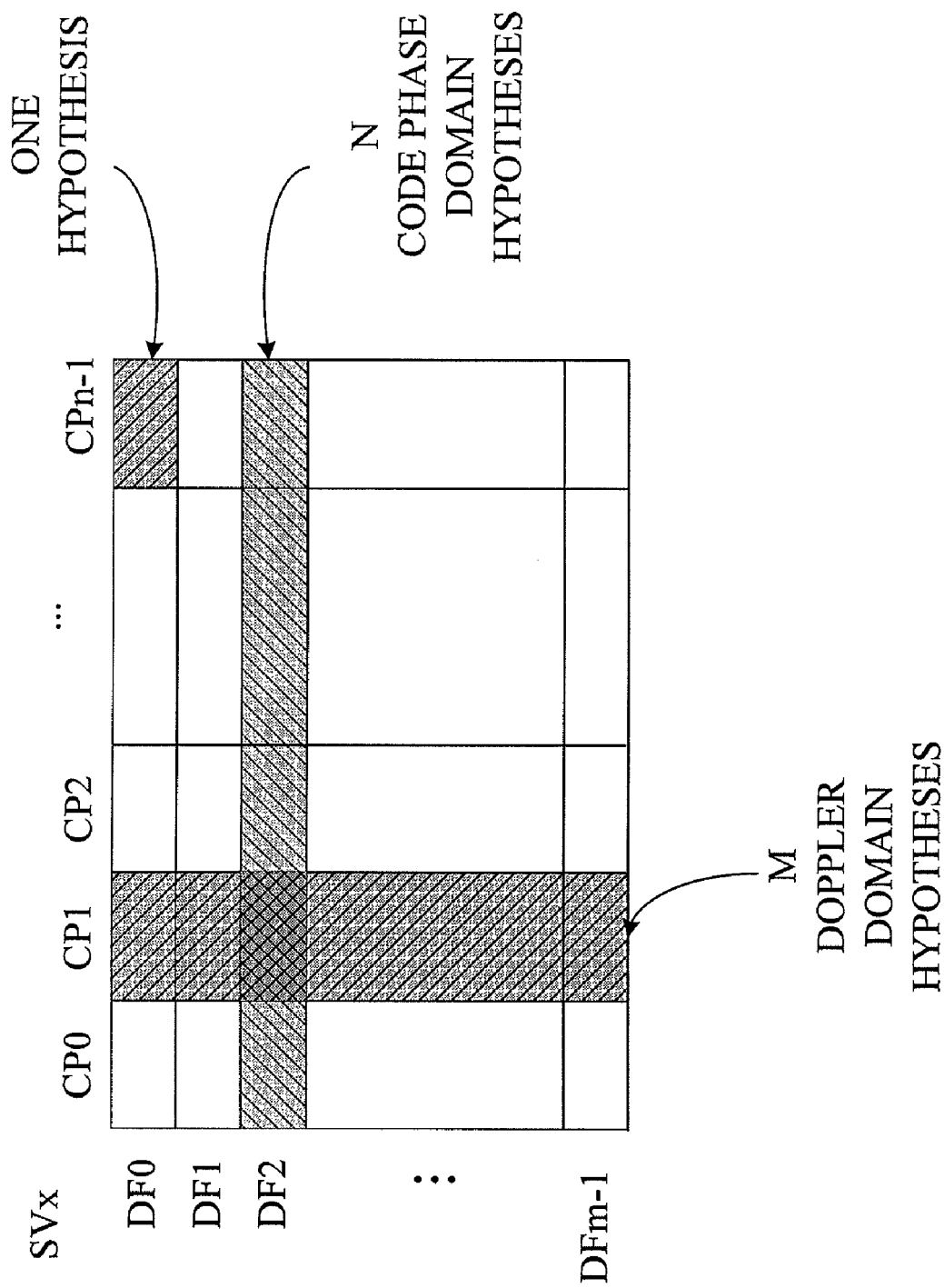
FIG. 1 schematically shows hypotheses in code phase domain and Doppler frequency domain for a specific satellite.
Figure 2:
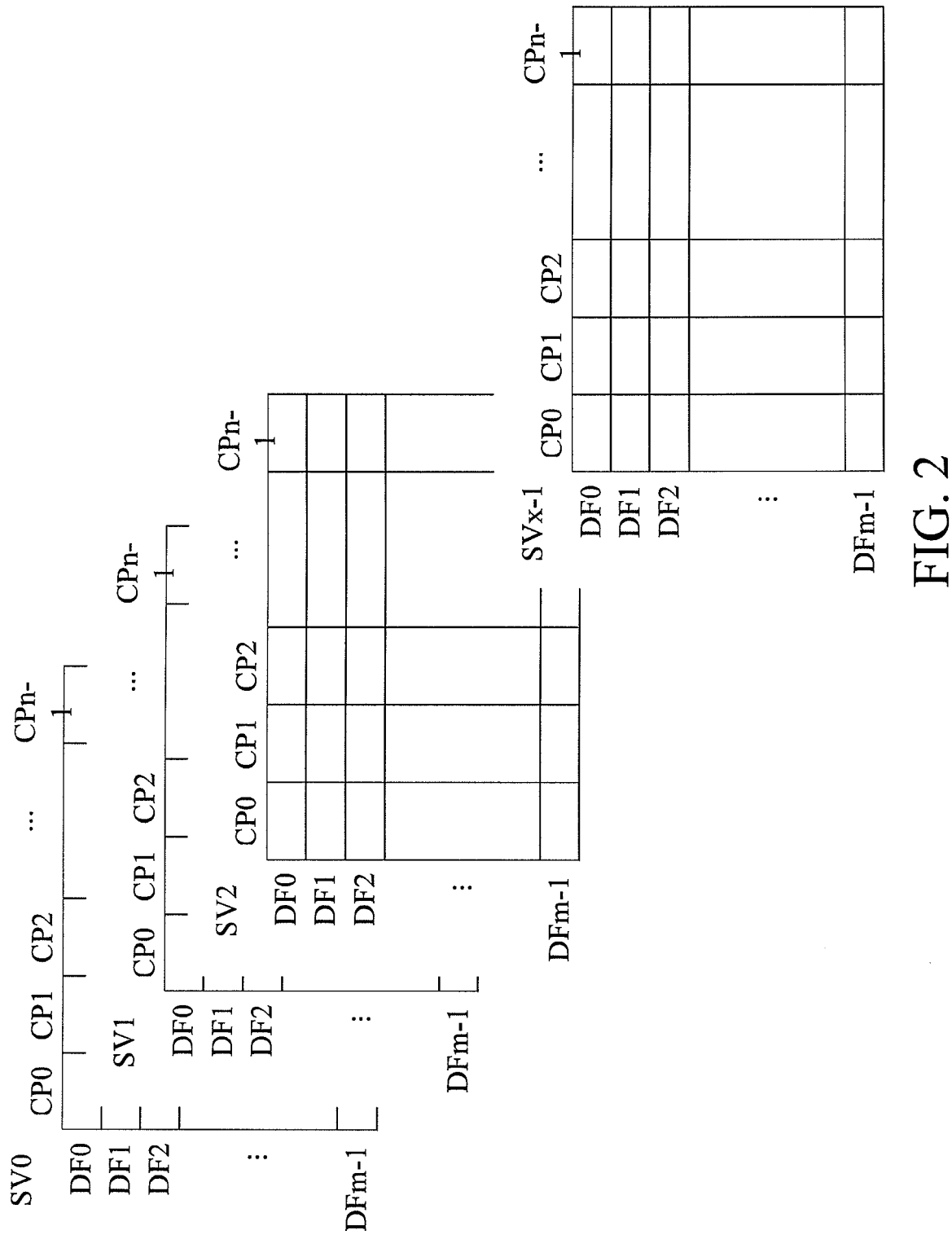
FIG. 2 schematically shows hypotheses in code phase domain and Doppler frequency domain for available satellites.

The present invention will be described in detail in conjunction with the appending drawings. As described, total hypothesis trial number for a time-division multiplexing receiver is X×M×N×P. Suppose that a clock rate is K multiples of the hardware multiplexing rate (e.g. 33 kHz for the correlator has 31 pairs of multipliers and adders). An equation of multiplexing is as follows:

$$K >= X \times M \times N \times P \quad (1)$$

Where M is the hypothesis number to be tried in Doppler frequency domain, N is the hypothesis number to be tried in code phase domain. P indicates the accuracy to be achieved. As mentioned, P=2 indicates that the chip spacing is ½ chip, P=4 indicates that the chip spacing is ¼ chip. X indicates the satellite number to be tried. K is the total hypothesis number can be tried in one millisecond.

In one case, K is fixed. The time-division multiplexing of the receiver for trying the hypotheses is adaptively arranged based on the fix clock rate. For example, if K=2046, which means 2046 hypotheses are tried in one millisecond. The multiplexing for K can be distributed as 1×1×1023×2. That is, in one millisecond, 1023 code phase hypotheses for a specific satellite and a specific Doppler frequency are tried with an accuracy of ½ chip spacing. In some cases, the code phase range is known. Therefore, it is not necessary to try all the hypotheses in the code phase domain. For example, the multiplexing of K can be 1×3×341×2. That is, in one millisecond, 341 code phase trials at three different Doppler frequencies for a specific satellite are done with half chip spacing accuracy.

After the satellite signal is acquired, the searching process enters signal tracking. In this condition, the code phase is locked. At this time, it does not need to search so many code phase hypotheses. Then the multiplexing of K can be changed to 11×3×15×4. That is, in one millisecond, 11 satellites are searched. For each satellite, hypotheses for three different Doppler frequencies, 15 code phase candidates are done with ¼ chip spacing accuracy. As described, the multiplexing for the hypotheses can be properly distributed to be adaptable for the application mode under the fixed clock rate. Such a manner is referred to as "fix-rate-adaptive-domain".

However, in practice, sometimes there is no need to search a range of 15 hypotheses in code phase domain, and there is no need to search at three different Doppler frequencies. In addition, sometimes it is not necessary to search so many satellites. If such unnecessary trials can be omitted, then power consumption of the receiver can be significantly reduced.

In another case, K is variable. The clock rate is changed for different mode. For example, in satellite searching mode, the receiver needs to acquire satellites as soon as possible. Therefore, a higher clock rate is recommended. In satellite tracking mode, a lower clock rate can be used to reduce power consumption. Such a manner is referred to as "adaptive-rate-adaptive-domain".

As described, some GNSS systems, such GALILEO, there are pilot channel and data channel for each satellite. That is, each satellite transmits two types of signals, pilot signal and data signal. For the same satellite, the pilot channel and data channel use different identification codes, such as different PRN codes. Therefore, the pilot channel and data channel of the same satellite can be deemed as two separate satellites in the TDM methodology proposed in the present invention. The equation can be expressed as:

$$K >= (Xp + Xd) \times M \times N \times P \quad (2)$$

wherein Xp and Xd respectively indicate the allocation of correlation time slots for pilot channel and the data channel respectively. That is, it can be deemed as the satellite number is double.

For the same satellite, although the pilot signal transmitted through the pilot channel and the data signal transmitted through the data channel are coded with different PRN codes, other parameters such as Doppler shift and code phase for the pilot channel and the data channel are the same. That is, in addition to the parameter PRN code, other parameters of the pilot channel and data channel of one satellite such as Doppler frequency and code phase are common. Accordingly, it will cause a calculation waste if the pilot channel and the data channel of the same satellite are completely dealt with as different satellites.

As mentioned, the pilot signal is known. It is possible to acquire and track the pilot signal of the pilot channel for a specific satellite, and to track the data carried in the data channel by using the information such as Doppler shift and code phase obtained from the pilot channel. That is, satellite tracking loop of the receiver can allot most of the calculation load to calculate the pilot signal of the pilot channel to acquire and track the pilot signal. The satellite tracking loop only needs to track the data channel of the same satellite when data channel despreading and data bit demodulation are enabled. Correlation workload is mainly allotted to acquire and track the pilot signal and only a small portion of the workload is distribute to despread and demodulate the data carried on the data channel of the same satellite.

Figure 3:
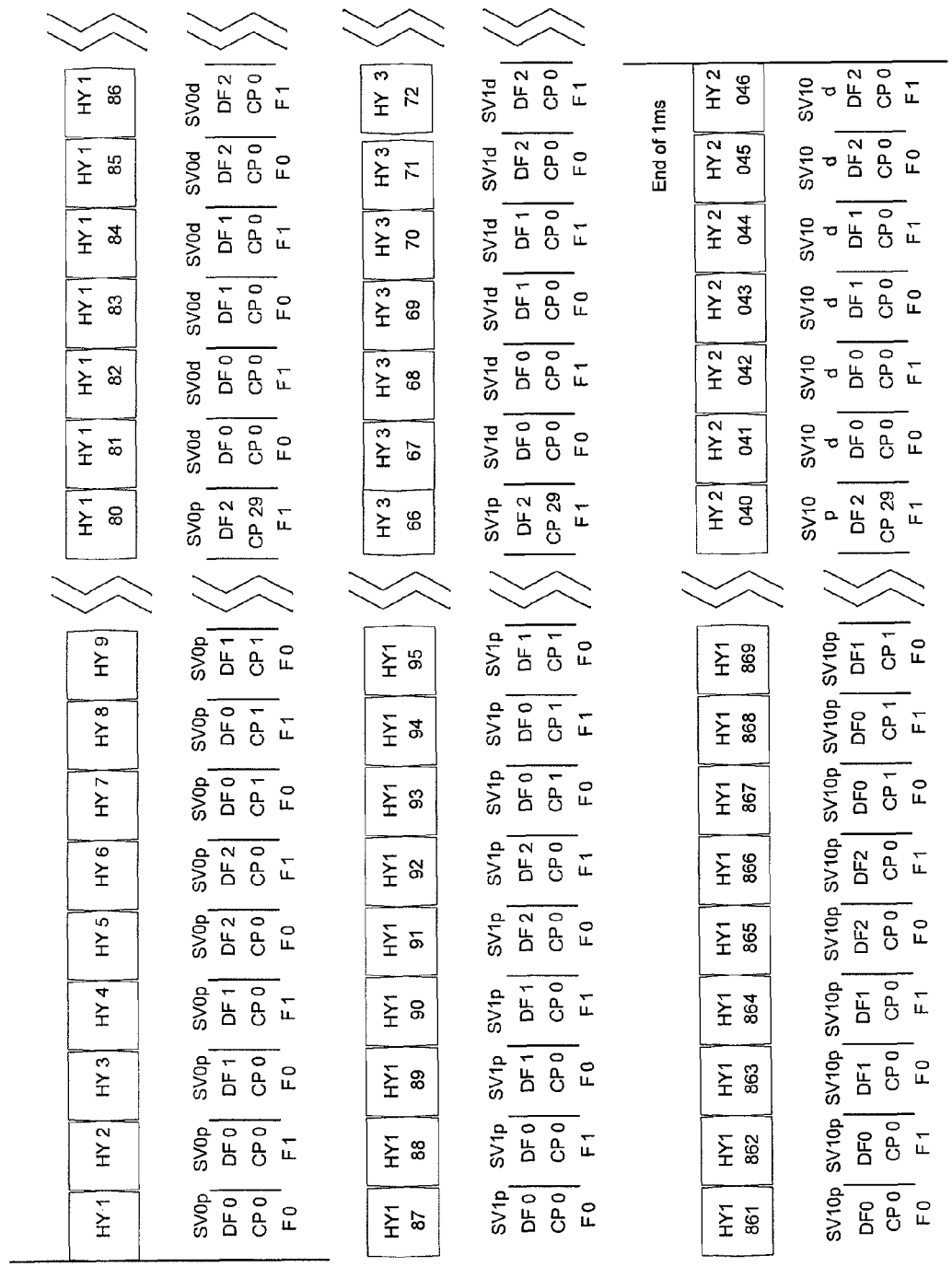
FIG. 3 shows an example of hypothesis distribution in accordance with the present invention.

FIG. 3 shows an example of time-division multiplexing distribution for hypotheses in accordance with the present invention. In this example, K=2046. That is, in 1 ms, there are 2046 hypotheses to be tried. The 2046 hypotheses are tried in TDM scheme. Each hypothesis is tried in one time slot. Furthermore, the multiplexing distribution in the respective domains of satellite, Doppler frequency, code phase and chip spacing is set as K=11×3×31×2. That is, hypotheses of 11 satellites are tried. For each satellite, 3 Doppler frequencies and 31 code phases are to be tried. In addition, the chip spacing is ½ chip. As mentioned, the range of 31 code phase hypotheses is more than enough. According to the present invention, a small portion of the code phase domain hypotheses are allotted to process data for navigation, while the rest hypotheses are used to acquire and track the pilot signal. In this example, there are 3×31×2=186 hypotheses to be tried for each satellite. Among the 186 hypotheses for each satellite (SV0 to SV10), 180 hypotheses (HY1 to HY 180, HY187 to HY366, . . . , HY1861 to HY2040) are used to execute correlation of the pilot signal, and the last 6 hypotheses (HY181 to HY186, HY367 to HY372, . . . , HY2041 to HY2046) are distributed to despread the data of the data channel. In this drawing, the letters "p" and "d" following the satellite ID (SV0 to SV10) indicate the pilot channel and the data channel, respectively. In this example, the hypotheses for processing the data are set as the code phase is CP0. However, other settings are also possible, the setting is determined depending on practical considerations. For example, it can be set that a portion of hypotheses for the code phase CP8 are to be spent to process the data.

Figure 4:
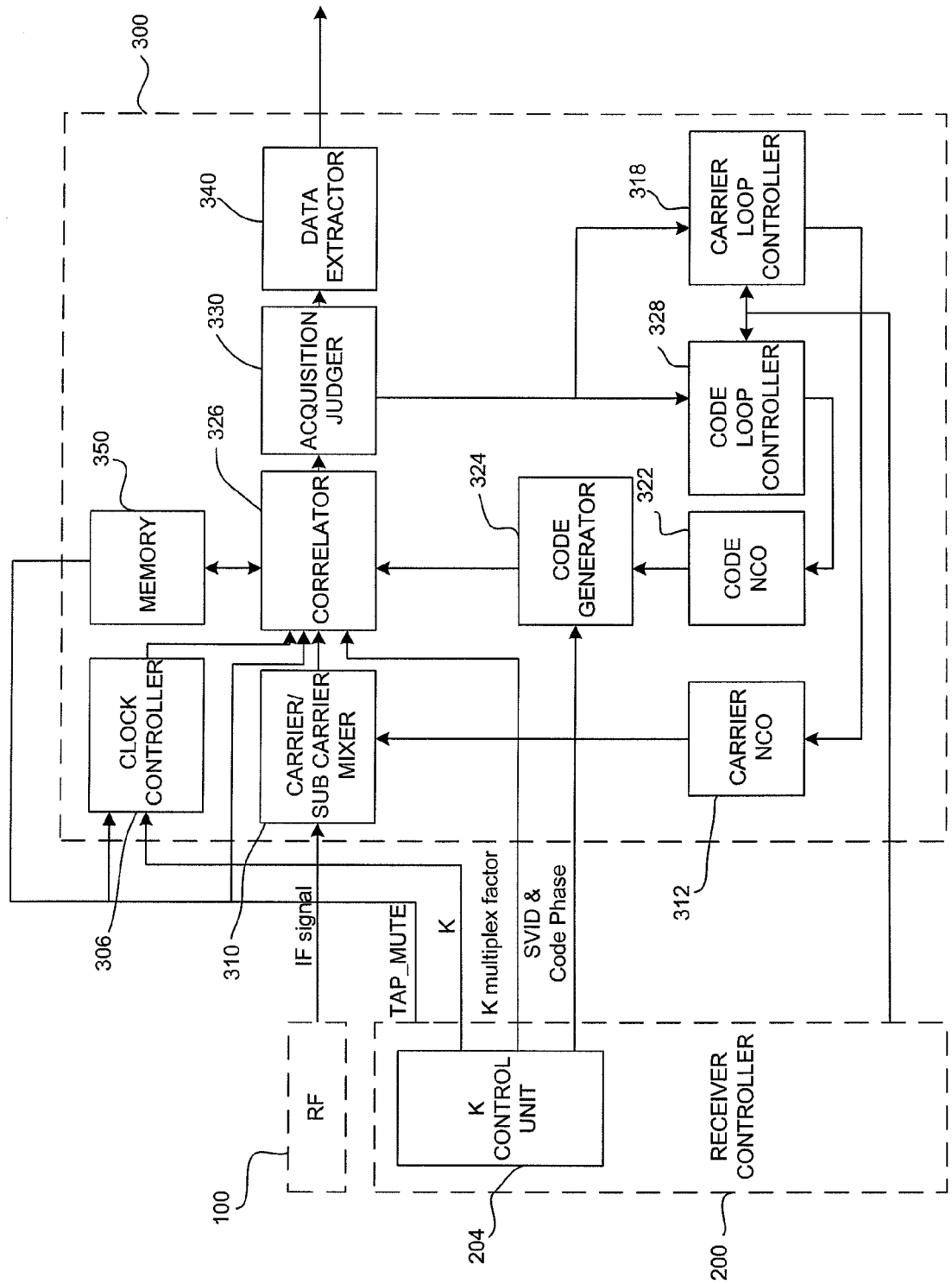
FIG. 4 is a block diagram showing a GNSS receiver in accordance with the present invention.

FIG. 4 is a block diagram showing a structure of a GNSS receiver, which comprises a baseband rear end 300 in accordance with the present invention. The receiver device will be described with the example shown in FIG. 3. As shown in FIG. 4, the receiving device includes an RF front end 100, in which all RF related processes are done, a receiver controller 200 and the baseband (BB) rear end 300. The RF front end 100 receives GNSS (e.g. Galileo) signals, which are spread coded, and converts the signals to intermediate frequency (IF) signals. The IF signals are output to the baseband rear end 300. The signals include the pilot signal and data signal for each available satellite. The operations thereof will be described in detail later.

Each IF signal is transmitted to a carrier mixer/subcarrier remover 310 of the baseband rear end 300. The carrier mixer portion of the carrier mixer/subcarrier remover 310 mixes the IF signal with a carrier signal generated from a carrier NCO (numerical controlled oscillator) 312 to convert the IF signal to a baseband signal. In addition, the subcarrier remover portion thereof is in charge of removing subcarrier of the signal. Alternatively, the carrier and subcarrier of the signal can be wiped off in combination. Various methods for removing the carrier and subcarrier can be used therein. A code generator 324 uses a code clock generated by a code NCO 322 to generate pseudo-random noise (PRN) code signal. To acquire the pilot signal, a correlator 326 uses the known PRN codes of the pilot signals of the respective satellites to execute correlation with the received signal. A clock signal with a clock rate K is provided by a clock controller 306. The correlator 326 executes correlation according to the clock signal. The provision of K can be a resident operation in the receiver. The correlator 326, which comprises a code mixer (not shown) and an accumulator (not shown), mixes the baseband signal with the PRN code signal to despread the spread coded signal and integrates the mixed result. That is, the correlator 326 executes correlation to the baseband signal. Before correlation, the correlator 326 receives an instruction concerning the distribution of K, which has been introduced above, and then executes correlation according to the instruction. This instruction, which is referred to K multiplex factor, is issued by a K control unit 204. The K multiplex factor will be further described later. This K control unit 204 can be built in the receiver controller 200 or externally provided in a hardware, firmware or software form. In the present embodiment, the K control unit 204 is set in the receiver controller 200. The integration result of the correlator 326 is stored in a memory 350. An acquisition judger 330 determines if an acquisition is achieved according to the output of the correlator 326. If the acquisition is achieved, the acquisition judger 330 triggers signal tracking. Since the searching speed is not necessary to be so fast in the tracking mode, the clock rate K can be lowered down. In addition, the ranges of code phase domain and Doppler frequency domains can be narrowed in the tracking mode. Accordingly, the K multiplex factor can be changed to adjust the time-division multiplexing of the correlator 326. The acquisition judger 330 feeds back signals to adjust the carrier NCO 312 and code NCO 322 via a carrier loop controller 318 and a code loop controller 328, respectively, so as to track the signal in code phase domain and Doppler frequency domain. A data extractor 340 is used for extracting data of input signal according to the output of the correlator 326.

After the pilot signal of a specific satellite is acquired, Doppler frequency and the code phase of the satellite are obtained. Accordingly, the data channel of the same satellite is deemed as been acquired. The correlator 326 is controlled to execute correlation for the data of the data channel to despread the data at time slots of designated hypotheses. In this example, the last six hypotheses distributed to each satellite are used to process the data.

As described, the clock controller 306 provides the clock with the clock rate K. The clock rate can be fixed or variable. In the case that the clock rate is variable, the clock controller 306 receives a command concerning K value provided by the K control unit 204 to control the clock rate and accordingly the operation speed of the correlator 326. The clock controller 306 contains a counter (not shown), the correlator 326 executes correlation according to the count of the counter. For example, with reference to FIG. 3, the correlator 326 executes correlation to the pilot signal when the counter counts the hypotheses from HY1 to HY180 for satellite SV0, while executes correlation to data when the counter counts the hypotheses from HY181 to HY186.

Figure 5:
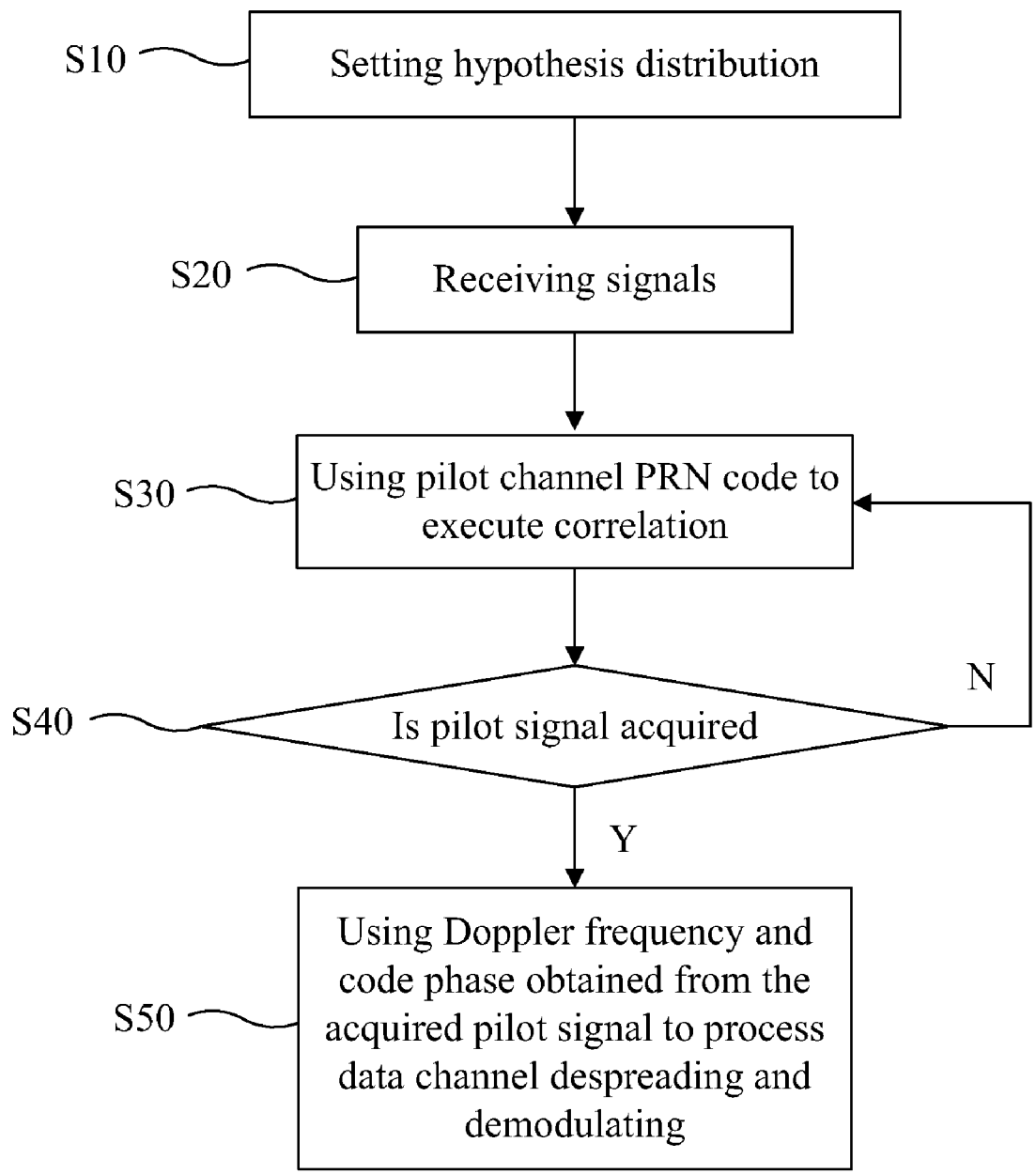
FIG. 5 is a flow chart showing a TDM method for processing pilot channel and data channel of a GNSS system.

The TDM method for processing the pilot channel and data channel of GNSS such as Galileo system proposed in the present invention can be summed up as the flow chart shown in FIG. 5. In step S10, hypothesis distribution is set by the receiver controller 200. In this step, which ones of all hypotheses within a cycle (e.g. 1 ms) to be used to process data are determined. The rest hypotheses are used to acquire and track the pilot signal. It is noted that the setting can be changed or adjusted at any time. In the example shown in FIG. 3, the last six hypotheses of 186 hypotheses for each satellite are set to be used to process data, while the other 180 hypotheses are used to acquire/track the pilot signal. In step S20, the receiver receives signals and executes necessary RF operations with the RF front end 100. It is noted that signal receiving keeps running, the step sequence described herein is just for the sake of simplification and clarity of description rather than limitation of the practical operation sequence. In step S30, the receiver uses known PRN code of the pilot signal to execute correlation in the correlator 326. As described above, the acquisition judger 330 judges if an acquisition is done (step S40). If the pilot signal has not been acquired, the correlation for acquiring the pilot signal keeps running. If the pilot signal is acquired, then the pilot signal is tracked. In addition, Doppler frequency and code phase of the pilot signal are obtained. As mentioned, for a specific satellite, Doppler frequency and code phase of the pilot channel and data channel are the same. When the Doppler frequency and code phase of the pilot channel are known, it is similar that the data channel is acquired. In step S50, the correlator 326 uses the obtained Doppler frequency and code phase to despread and even demodulate data of the data channel in the specific hypotheses determined in the hypothesis distribution setting.

In some circumstances, it is not necessary to try so many hypotheses. According to the present invention, the correlator 326 and some other components can be idle during some time slots of TDM. The receiver controller 200 generates a disable signal TAP_MUTE to deactivate some components of the receiver during TDM time slots for CPn>2040 for example, so that such components are idle during these time slots to save power consumption. In modern receivers, the components consuming the most power are correlator and memory cells. Therefore, in the present embodiment, the disable signal TAP_MUTE is transmitted to the clock controller 306 to turn off a correlator clock, to the memory 350 to pull off a chip-enable signal of the memory, and the correlator 326 to turn off communication logics in the correlator 326. However, the disable signal TAP_MUTE can also sent to other components to deactivate some signals or circuits, so as to reduce power consumption. The conditions for the disable signal TAP_MUTE to be transmitted can be set as desired.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A receiver for receiving a first signal of a first signal channel and a second signal of a second signal channel from a satellite, the first signal channel having at least one known parameter, at least one parameter different from the second signal channel and at least one parameter common to that of the second signal channel, a specific combination of the respective parameters composing a hypothesis, the receiver comprising:
   a correlator for executing correlation;
   a clock controller controlling a clock rate for the correlator; and
   a control unit providing a total hypothesis number that can be tried in a specific period for the first signal and the second signal, and setting a hypothesis distribution for total hypotheses of the total hypothesis number according to the respective parameters,
   wherein the clock controller controls the clock rate for the correlator according to the total hypothesis number, and the correlator executes correlation for the total hypotheses according to the hypothesis distribution.

2. The receiver of claim 1, wherein the first signal channel is a pilot channel and the second signal channel is a data channel.

3. The receiver of claim 1, wherein the different parameter is the identification code.

4. The receiver of claim 1, wherein the at least one common parameter includes Doppler frequency and code phase.

5. The receiver of claim 1, wherein the control unit sets the hypothesis distribution by considering the first signal channel and second signal channel as two different satellites.

6. The receiver of claim 1, wherein the correlator executes correlation to acquire the first signal by using the known parameter.

7. The receiver of claim 1, wherein the control unit allots a portion of hypotheses to execute correlation to despread the second signal of a specific satellite by using the common parameter between the first and second signal channels when the first signal channel of the same satellite is acquired and the parameters of the first signal channel are obtained.

8. The receiver of claim 1, wherein the first signal channel is a pilot channel and the second signal channel is a data channel, the at least one parameter common to the two channels includes Doppler frequency and code phase.

9. The receiver of claim 8, wherein the control unit allots a portion of hypotheses for a specific code phase of the pilot channel to process the data channel by the correlator.

10. The receiver of claim 1, wherein the control unit determines if a time slot of a hypothesis is to be idle and outputs a disable signal to deactivate the correlator during the time slot of the hypothesis when the time slot is determined to be idle.

11. A method for receiving a first signal of a first signal channel and a second signal of a second signal channel from a satellite, the first signal channel having at least one known parameter, at least one parameter different from the second signal channel and at least one parameter common to that of the second signal channel, a specific combination of the respective parameters composing a hypothesis, the method comprising:
   setting a hypothesis distribution for total hypotheses for the first and second signals of the satellite within the specific period according to the respective parameters; and
   executing correlation for each hypothesis of the total hypotheses according to the hypothesis distribution.

12. The method of claim 11, wherein the first signal channel is a pilot channel and the second signal channel is a data channel 13. The method of claim 11, wherein the different parameter is the identification code.

14. The method of claim 11, wherein the at least one common parameter includes Doppler frequency and code phase.

15. The method of claim 11, wherein the first signal channel and second signal channel are considered as two different satellites in the hypothesis distribution setting step.

16. The method of claim 11, wherein the correlation is executed to acquire the first signal channel by using the known parameter.

17. The method of claim 11, wherein a portion of hypotheses are allotted to execute correlation to despread the second signal channel of a specific satellite by using the common parameter between the first and second signal channels when the first signal channel of the same satellite is acquired and the parameters of the first signal channel are obtained.

18. The method of claim 11, wherein the first signal channel is a pilot channel and the second signal channel is a data channel, the parameter common to the two channels includes Doppler frequency and code phase.

19. The method of claim 18, wherein a portion of hypotheses for a specific code phase of the pilot channel are allotted to process the data channel.

20. The method of claim 11, further comprising determining if a time slot of a hypothesis is to be idle and outputting a disable signal to deactivate correlation during the time slot of the hypothesis when the time slot is determined to be idle.

* * * * *